(12) United States Patent
Kitta et al.

(10) Patent No.: US 10,103,602 B2
(45) Date of Patent: Oct. 16, 2018

(54) ROTARY ELECTRIC MACHINE

(71) Applicant: Mitsubishi Electric Corporation, Chiyoda-ku, Tokyo (JP)

(72) Inventors: Yoshiaki Kitta, Tokyo (JP); Manabu Yoshinori, Tokyo (JP); Tadashi Murakami, Tokyo (JP); Yukitaka Sakata, Tokyo (JP); Katsunari Takagi, Tokyo (JP); Koichi Ojima, Tokyo (JP); Masaya Inoue, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 267 days.

(21) Appl. No.: 15/041,180

(22) Filed: Feb. 11, 2016

(65) Prior Publication Data
US 2017/0063201 A1    Mar. 2, 2017

(30) Foreign Application Priority Data

Aug. 26, 2015   (JP) ................................ 2015-167036

(51) Int. Cl.
| | |
|---|---|
| *H02K 9/19* | (2006.01) |
| *H02K 3/32* | (2006.01) |
| *H02K 3/28* | (2006.01) |
| *H02K 5/10* | (2006.01) |
| *H02K 5/20* | (2006.01) |
| *H02K 3/24* | (2006.01) |

(52) U.S. Cl.
CPC ................ *H02K 9/19* (2013.01); *H02K 3/24* (2013.01); *H02K 3/28* (2013.01); *H02K 3/325* (2013.01); *H02K 5/10* (2013.01); *H02K 5/20* (2013.01); *H02K 2203/12* (2013.01)

(58) Field of Classification Search
CPC ...... H02K 2203/12; H02K 3/28; H02K 3/325; H02K 5/10; H02K 5/20; H02K 9/19; H02K 3/24
USPC .......................................................... 310/54
See application file for complete search history.

(56) References Cited

U.S. PATENT DOCUMENTS

2010/0320878 A1\* 12/2010 Izumi ....................... H02K 5/20
310/60 R
2013/0270931 A1    10/2013 Handa et al.
(Continued)

FOREIGN PATENT DOCUMENTS

| JP | 2010-239776 A | 10/2010 |
|---|---|---|
| JP | 4857327 B2 | 1/2012 |

(Continued)

OTHER PUBLICATIONS

Communication dated May 31, 2016 from the Japanese Patent Office in counterpart Application No. 2015-167036.

*Primary Examiner* — Alex W Mok
(74) *Attorney, Agent, or Firm* — Sughrue Mion, PLLC; Richard C. Turner (57) ABSTRACT

Provided is an electric motor capable of cooling a stator without being increased in size with a small number of components and even with simple work. The electric motor includes ring-shaped sealing members (34) having flexibility and being arranged on an inner diameter side of a stator coil (22) so as to surround inner diameter portions of coil ends. Cooling oil flowing from an upper part of a housing into the housing flows downward through coil end oil paths (37, 38) formed by the sealing members (34), coil end covers (32, 33), and the coil ends.

11 Claims, 6 Drawing Sheets

(56) References Cited

U.S. PATENT DOCUMENTS

2014/0346905 A1* 11/2014 Matsui .................... H02K 9/19
310/54
2015/0295474 A1* 10/2015 Murota ................. H02K 9/197
310/43

FOREIGN PATENT DOCUMENTS

| JP | 5320118 B2 | 10/2013 |
| JP | 2015-33226 A | 2/2015 |
| WO | 2012/086227 A1 | 6/2012 |

* cited by examiner

ROTARY ELECTRIC MACHINE

BACKGROUND OF THE INVENTION

1. Field of the Invention

The present invention relates to a rotary electric machine in which a stator is cooled by using a cooling medium flowing downward inside a housing.

2. Description of the Related Art

Hitherto, the following stator is known. Specifically, the stator includes an annular stator core, an annular outer cover arranged on an outer circumferential surface side of the stator core, an annular inner cover arranged on an inner circumferential surface side of the stator core, an annular first coil end cover that closes an open portion formed between the outer cover and the inner cover on one end portion side in a central axis direction of the stator core, and an annular second coil end cover that closes the open portion formed between the outer cover and the inner cover on another end portion side in the central axis direction of the stator core. The outer cover, the inner cover, the first coil end cover, and the second coil end cover construct a cooling jacket (for example, Japanese Patent No. 5320118).

The stator described above has the following problems. Specifically, the stator requires a space for arranging the cooling jacket, resulting in increased size of the stator. At the same time, a larger number of components for constructing the cooling jacket are required. Further, complicated work for mounting the cooling jacket to the stator is required.

SUMMARY OF THE INVENTION

The present invention has been made to solve the problems described above, and therefore has an object to provide a rotary electric machine capable of cooling a stator without being increased in size with a small number of components and even with simple work.

According to one embodiment of the present invention, there is provided a rotary electric machine, including:

a housing;

a shaft passing through the housing;

a rotator housed inside the housing and fixed to the shaft;

a stator fixed to the housing so as to surround an outer circumferential surface of the rotator, the stator including:

an annular stator core; and a stator coil wound around the stator core through intermediation of a coil bobbin, the stator coil including coil ends projecting from both end surfaces of the stator core along an axial direction of the shaft;

coil end covers arranged over entire circumferences of the coil ends so as to be opposed to each other in the axial direction; and ring-shaped sealing members having flexibility and being arranged on an inner diameter side of the stator coil so as to surround inner diameter portions of the coil ends, the sealing members, the coil end covers, and the coil ends forming coil end refrigerant flow paths through which a cooling medium flowing from an upper part of the housing into the housing flows downward.

According to the rotary electric machine of the one embodiment of the present invention, the ring-shaped sealing members having flexibility that surround the inner diameter portions of the coil ends are arranged on the inner diameter side of the stator coil so that the cooling medium flows downward through the coil end refrigerant flow paths formed by the sealing members, the coil end covers, and the coil ends. Therefore, the stator can be cooled without increasing the rotary electric machine in size with a small number of components and even with simple work.

DETAILED DESCRIPTION OF THE PREFERRED EMBODIMENTS

Referring to the drawings, an electric motor according to each embodiment of the present invention is described below. In the drawings, the same or corresponding components and parts are denoted by the same reference symbols.

First Embodiment

Figure 1:
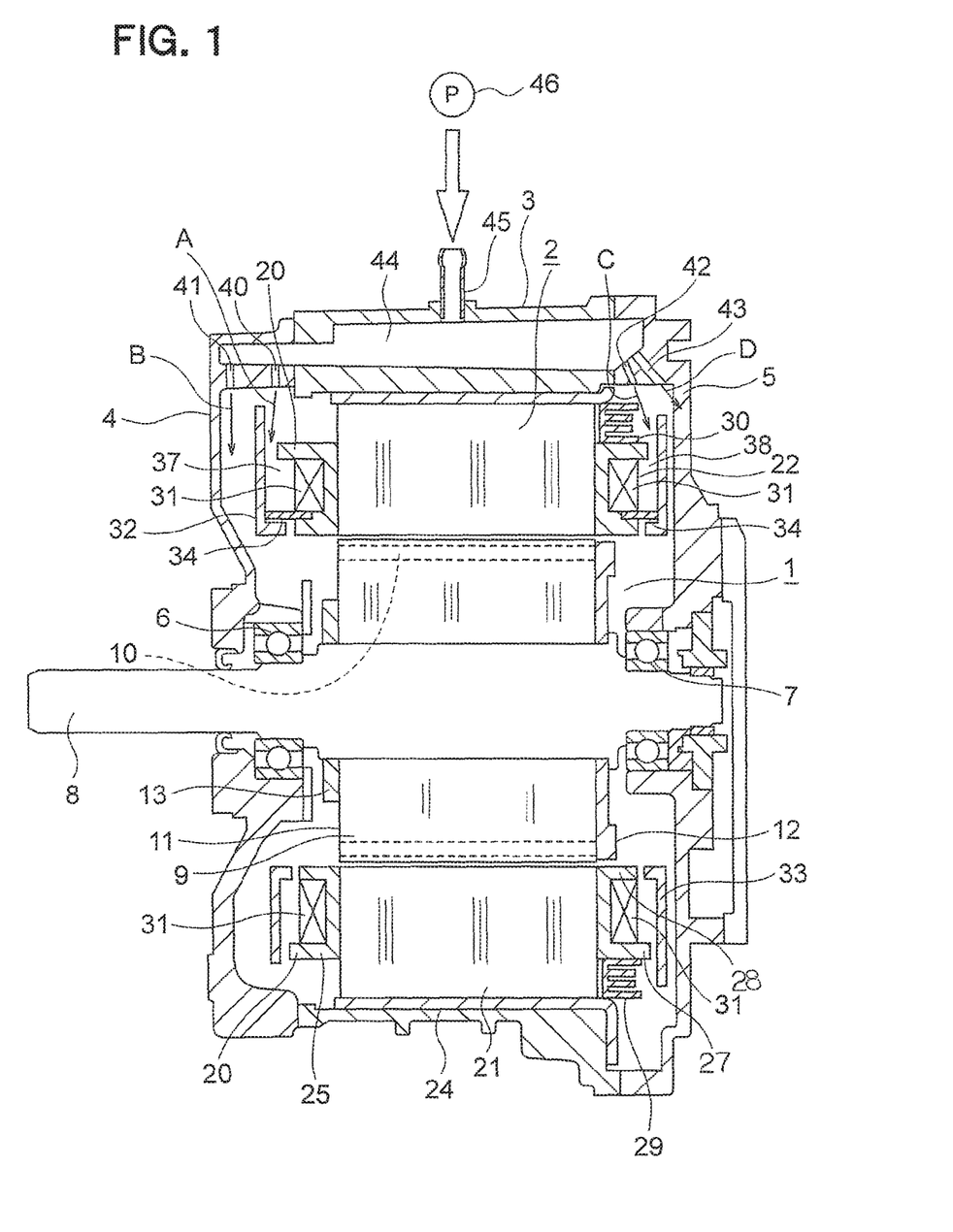
FIG. 1 is a schematic front sectional view of an electric motor according to a first embodiment of the present invention.
Figure 2:
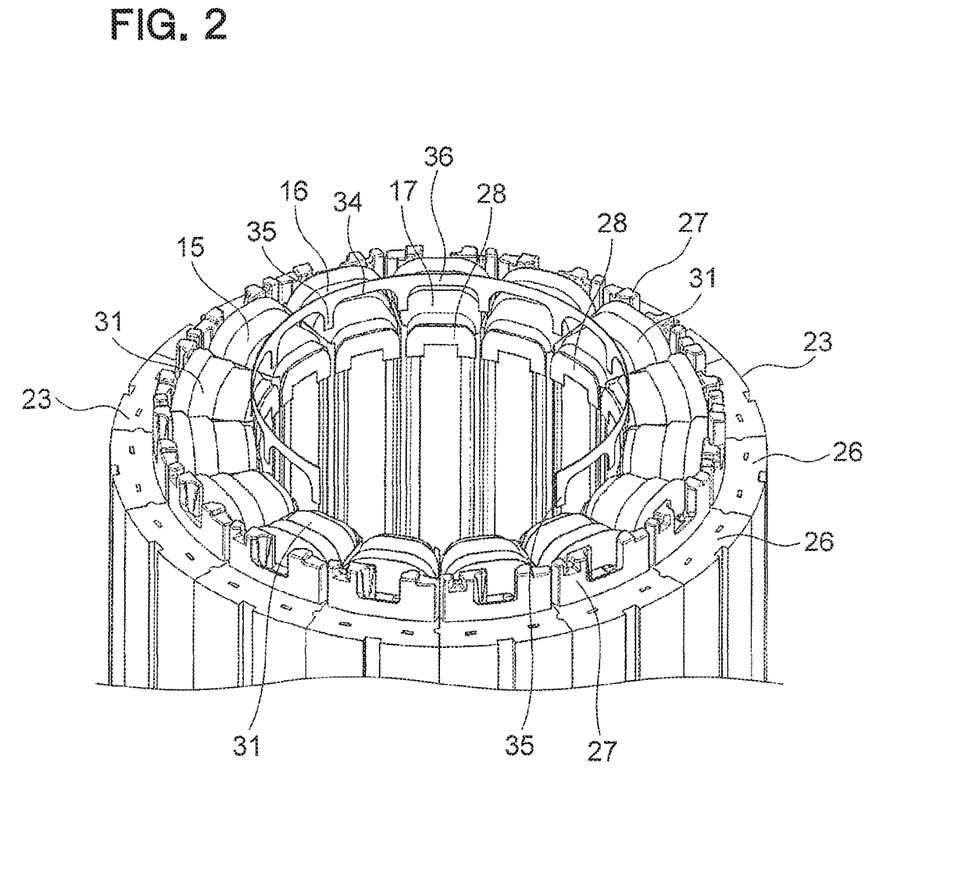
FIG. 2 is a partial perspective view for illustrating a main portion of a stator illustrated in FIG. 1.

FIG. 1 is a schematic front sectional view of an electric motor according to a first embodiment of the present invention, and FIG. 2 is a partial perspective view for illustrating a main portion of a stator 2 illustrated in FIG. 1.

The electric motor, which is a rotary electric machine, is an inner rotor-type three-phase brushless electric motor. The electric motor includes a rotator 1, the stator 2, a center frame 3, a front frame 4, and a rear frame 5. The stator 2 is provided so as to surround an outer circumferential surface of the rotator 1 through a constant gap therebetween. The center frame 3 made of aluminum surrounds a circumferential side surface of the stator 2 to fix the stator 2. The front frame 4 is provided on a load side so as to be located on the same axial line as that of the center frame 3. The rear frame 5 is provided on a counter-load side so as to be located on the same axial line as that of the center frame 3.

The front frame 4, the center frame 3, and the rear frame 5 construct a housing.

A load-side bearing 6 is held in a central portion of the front frame 4, whereas a counter-load-side bearing 7 is held in a central portion of the rear frame 5. The load-side bearing 6 and the counter-load-side bearing 7 support a shaft 8 in a freely rotatable manner. The shaft 8 is arranged so as to extend on a central axis line of the front frame 4 and the rear frame 5.

The rotator 1 includes a rotator core 9, permanent magnets 10, a load-side end plate 11, a counter-load-side end plate 12, and a fixing member 13. The rotator core 9 is fitted over the shaft 8 and is made of thin steel plates laminated in an axial direction of the rotator 1. The permanent magnets 10 are respectively accommodated in magnet accommodating holes that are formed through the rotator core 9 at intervals in a circumferential direction of the rotator 1 so as to extend in the axial direction of the rotator 1. The load-side end plate 11 is provided on a load-side end surface of the rotator core 9 and prevents the permanent magnets 10 from falling off in cooperation with the counter-load-side end plate 12 that is provided on a counter-load-side end surface of the rotator core 9. The fixing member 13 is provided in an inner diameter portion of the rotator core 9 on the load side to fix the rotator core 9 to the shaft 8.

The stator 2 includes an annular stator core 21 and a stator coil 22 wound around the stator core 21 through intermediation of a coil bobbin 25.

The stator core 21 includes 3n (n is an integer) divided stator cores 23 arranged in an annular fashion. The divided stator cores 23 are fastened to each other by shrink fitting with a frame 24 made of iron having a cylindrical shape.

Each of the divided stator cores 23 is made of thin steel plates laminated in an axial direction of the stator 2. Each of the divided stator cores 23 includes a back yoke portion 26 having an arc-like shape and a tooth (not shown) that is formed on an inner circumferential surface of the back yoke portion 26 to project radially inward toward a central axis line of the stator core 21 from a circumferential center portion of the back yoke portion 26.

The coil bobbin 25 includes a plurality of divided coil bobbins 20. Each of the divided coil bobbins 20 includes a tubular portion (not shown), a first flange 27, and a second flange 28. The tubular portion surrounds the tooth. The first flange 27 projects outward in the axial direction of the stator 2 from an end portion of the tubular portion on the back yoke portion 26 side. The second flange 28 projects outward in the axial direction of the stator 2 from an end portion of the tubular portion on a side opposite to the back yoke portion 26 side.

The stator coil 22 includes a plurality of U-phase coil portions 15 corresponding to a U-phase, a plurality of V-phase coil portions 16 corresponding to a V-phase, and a plurality of W-phase coil portions 17 corresponding to a W-phase.

Each of the U-phase coil portions 15, the V-phase coil portions 16, and the W-phase coil portions 17, which are divided stator coils, is formed by winding a conducting wire that is an enameled wire around the tooth in concentrated winding through intermediation of corresponding one of the divided coil bobbins 20.

On an outer diameter side of a counter-load-side end surface of the stator core 21, a bus bar holder 29 extending over the entire circumference of the stator core 21 is provided. Inside the bus bar holder 29, bus bars 30 for feeding power to the U-phase coil portions 15, the V-phase coil portions 16, and the W-phase coil portions 17 are accommodated.

Coil ends of the stator coil 22, which project from both end surfaces of the stator core 21 in an axial direction of the shaft 8, include a plurality of divided coil ends 31 that are a plurality of coil end portions.

The divided coil ends 31 are coil end portions of the U-phase coil portions 15, the V-phase coil portions 16, and the W-phase coil portions 17.

A first coil end cover 32 is provided on the front frame 4 side of each of the divided coil ends 31 in the axial direction and a second coil end cover 33 is provided on the rear frame 5 side thereof so that the first coil end cover 32 and the second coil end cover 33 are opposed to the divided coil ends 31.

Figure 3:
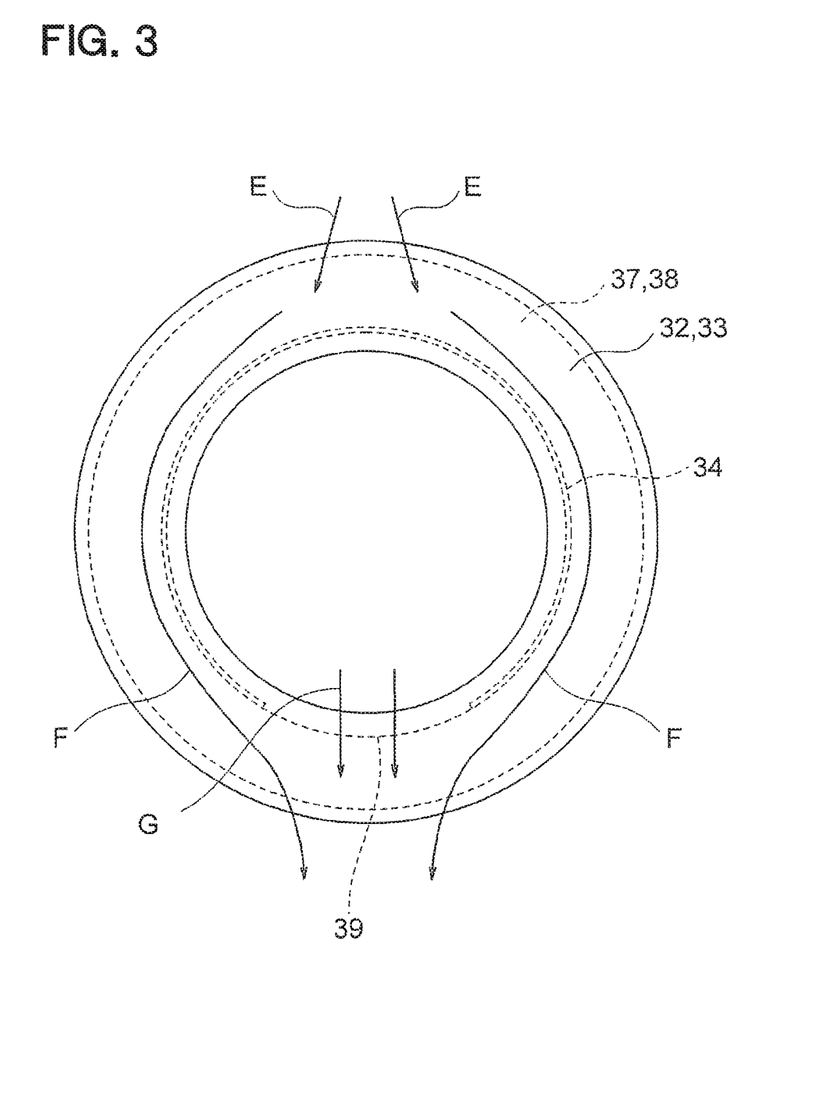
FIG. 3 is a view illustrating flow of the cooling oil inside of coil end oil path in FIG. 1.

Each of the first coil end cover 32 and the second coil end cover 33 is a circular plate having a circular hole formed in a central portion as illustrated in FIG. 3 and has an end portion that is formed on an inner diameter side so as to be bent inward.

Figure 4:
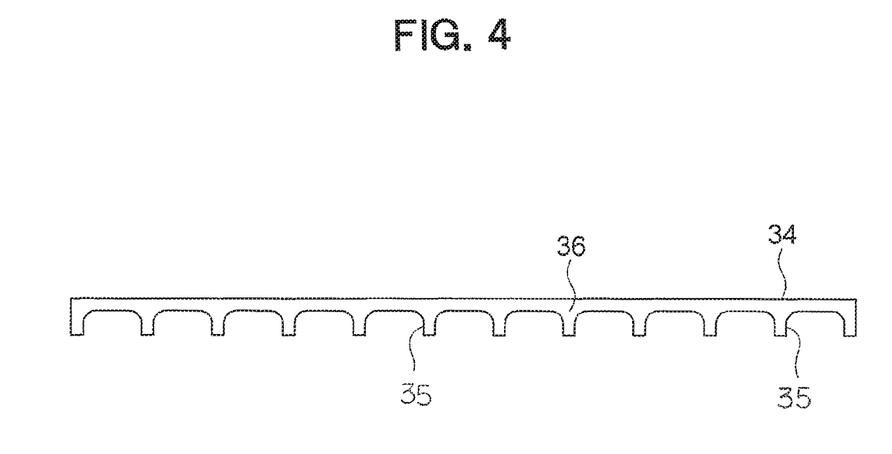
FIG. 4 is a developed view of the sealing member in FIG. 1.

FIG. 4 is a developed view of a ring-shaped sealing member 34 arranged on an inner diameter side of the stator core 22.

The sealing member 34 having flexibility and being made of insulating paper includes a band-like base portion 36 and projecting portions 35. The projecting portions 35 each having an arc-like bottom portion are formed on the band-like base portion 36 at equal intervals. The ring-shaped sealing member 34 includes a lacking portion 39 formed in a lower portion.

On the front frame 4 side, the base portion 36 of the sealing member 34 is partially interposed between the second flanges 28 of the divided coil bobbins 20, and inner diameter portions of the U-phase coil portions 15, the V-phase coil portions 16, and the W-phase coil portions 17 that are the divided stator coils. Further, the projecting portions 35 of the sealing member 34 are introduced into clearances formed between the adjacent divided coil ends 31.

A first coil end oil path 37, which is a first coil end refrigerant flow path, is formed by the base portion 36 of the sealing member 34, the divided coil ends 31, and the first coil end cover 32.

Similarly, on the rear frame 5 side, the base portion 36 of the sealing member 34 is partially interposed between the second flanges 28 of the divided coil bobbins 20, and the inner diameter portions of the U-phase coil portions 15, the V-phase coil portions 16, and the W-phase coil portions 17 that are the divided stator coils. The projecting portions 35 of the sealing member 34 are introduced into the clearances formed between the adjacent divided coil ends 31.

A second coil end oil path 38, which is a second coil end refrigerant flow path, is formed by the base portion 36 of the sealing member 34, the divided coil ends 31, and the second coil end cover 33.

The front frame 4 has a pair of first coil injection holes 40 formed into a V-like pattern and formed immediately above the lacking portion 39, as viewed along an axial line of the shaft 8. Each of the first coil injection holes 40 is oriented toward the inside of the first coil end oil path 37.

The front frame 4 further has a first bearing injection hole 41 that is formed on an outer side of the first coil injection holes 40 in the axial direction of the shaft 8 so as to be oriented toward the load-side bearing 6.

The rear frame 5 has a pair of second coil injection holes 42 formed into a V-like pattern and formed immediately above the lacking portion 39, as viewed along the axial line of the shaft 8. Each of the second coil injection holes 42 is oriented toward the inside of the second coil end oil path 38.

The rear frame 5 further has a second bearing injection hole 43 that is formed on an outer side of the second coil injection holes 42 in the axial direction of the shaft 8 so as to be oriented toward the counter-load-side bearing 7.

The center frame 3 has an expanding portion formed in an uppermost portion so as to be expanded in a radial direction of the center frame 3. Inside the expanding portion, an oil path 44 extending in the axial direction is formed.

The oil path 44 communicates with the first coil injection holes 40, the first bearing injection hole 41, the second coil injection holes 42, and the second bearing injection hole 43.

In the electric motor having the configuration described above, cooling oil, which is a cooling medium pressure-fed by a pump 46, flows from an oil path inlet portion 45 into the oil path 44 inside the center frame 3. On the front frame 4 side, the cooling oil is injected from the first coil injection holes 40 into the first coil end oil path 37, as indicated by the arrow A of FIG. 1.

Simultaneously, on the rear frame 5 side, the cooling oil is injected from the second coil injection holes 42 into the second coil end oil path 38, as indicated by the arrow C of FIG. 1.

Thereafter, as indicated by the arrows E of FIG. 3, the cooling oil inside each of the first coil end oil path 37 and the second coil end oil path 38 is split into two directions. The two streams of the cooling oil flow downward under a force of gravity as indicated by the arrows F while cooling each of the divided coil ends 31 that are the coil end portions, and finally pass through a lower space on the lower side of each of the first coil end oil path 37 and the second coil end oil path 38 to be discharged to the exterior of the housing.

When the cooling oil flowing in the first coil end oil path 37 and the second coil end oil path 38 leaks from a gap between the sealing member 34 and the first coil end cover 32 and a gap between the sealing member 34 and the second coil end cover 33 to the inner diameter side of the sealing members 34, the cooling oil directly joins the cooling oil flowing out of the first coil end oil path 37 and the second coil end oil path 38 through the lacking portions 39 as indicated by the arrows G of FIG. 3, to be directly discharged to the exterior of the housing.

On the front frame 4 side, the cooling oil is injected from the first bearing injection hole 41 toward the load-side bearing 6, as indicated by the arrow B of FIG. 1.

Simultaneously, on the rear frame 5 side, the cooling oil is injected from the second bearing injection hole 43 toward the counter-load-side bearing 7, as indicated by the arrow D of FIG. 1.

As a result, the cooling oil cools and lubricates the load-side bearing 6 and the counter-load-side bearing 7.

According to the electric motor of this embodiment, for the formation of the first coil end oil path 37 and the second coil end oil path 38, the inner diameter portions of the divided coil ends 31 are surrounded by the sealing members 34 having flexibility in a ring-like fashion, and hence a variation between the divided coil ends 31 in dimension is absorbed. Thus, the first coil end oil path 37 and the second coil end oil path 38 can be formed easily without increasing the electric motor in size.

Further, each of the sealing members 34 is made of insulating paper and has a small thickness. Therefore, reduction in space factor of the stator oil 22 can be suppressed.

Further, each of the sealing members 34 includes the base portion 36 and the projecting portions 35 each having the arc-like bottom portion and being formed on the base portion 36 at equal intervals. When being developed, each of the sealing members 34 is a band-like flat plate and therefore can be easily formed by, for example, punching.

Further, the cooling oil flowing into the first coil end oil path 37 is split into the two different directions by the first coil injection holes 40 arranged in the V-like pattern. Although the cooling oil is injected and collides against the first coil end cover 32, spilling of the cooling oil from the first coil end oil path 37 due to splashing is suppressed.

Similarly, the cooling oil flowing into the second coil end oil path 38 is split into the two different directions by the second coil injection holes 42 arranged in the V-like pattern. Although the cooling oil is injected and collides against the second coil end cover 33, spilling of the cooling oil from the second coil end oil path 38 due to splashing is suppressed.

The base portion 36 of each of the sealing members 34 is partially interposed between the divided coil ends 31 and the second flanges 28 of the divided coil bobbins 20. Therefore, an inner diameter portion of the first coil end oil path 37 and an inner diameter portion of the second coil end oil path 38 are held in contact with the divided coil ends 31.

Therefore, even when the amount of cooling oil is small, the cooling oil in the first coil end oil path 37 and the second coil end oil path 38 flows on the outer circumferential surfaces of the ring-shaped sealing members 34, that is, on the inner diameter side of the first coil end oil path 27 and on the inner diameter side of the second coil end oil path 38 to collide against the divided coil ends 31 that are held in abutment against the sealing members 34. As a result, each of the divided coil ends 31 can be reliably cooled.

Further, the conducting wires that are components of the stator coil 22 are fixed to each other with vanish. The sealing members 34 can be fixed to the divided coil ends 31 by directly using the vanish. Therefore, the sealing members 34 can be fixed to the divided coil ends 31 without providing a new structure for fixing the sealing members 34.

Further, each of the sealing members 34 is made of insulating paper. Therefore, even when the sealing members 34 are damaged, an electrical system is not affected thereby. Further, even when the sealing members 34 are interposed between the divided coil ends 31 and the divided coil bobbins 20, the effects on insulation of the stator coil 22 can be reduced.

Further, each of the sealing members 34 includes the plurality of projecting portions 35 formed at intervals, which are introduced into the gaps between the adjacent divided coil ends 31. The above-mentioned gaps are closed by the projecting portions 35. Therefore, sealing properties to the cooling oil in the first coil end oil path 37 and the second coil end oil path 38 are ensured, thereby ensuring cooling performance for the divided coil ends 31.

Further, the sealing members 34 respectively include the lacking portions 39 formed immediately below the first coil injection holes 40 and the second coil injection holes 42, through which the cooling oil from inside of the sealing members 34 flows downward. Therefore, the cooling oil leaking from the first coil end oil path 37 and the second coil end oil path 38 joins the cooling oil flowing downward in the first coil end oil path 37 and the second coil end oil path 38 through the lacking portions 39 to be directly discharged to the exterior of the housing.

Therefore, the cooling oil discharged to the exterior of the housing is supplied again to the inside of the housing by the pump 46 so as to be used to cool each of the divided coil ends 31.

Further, in a case of a sealing member having a perfect circular shape without the lacking portion 39, when the cooling oil leaking from the first coil end oil path 37 and the second coil end oil path 38 is accumulated up to a water level reaching an air gap between the stator 2 and the rotator 1, a rotational load of the rotator 1 is disadvantageously increased. By forming the lacking portion 39 in each of the sealing members 34, such a situation can be avoided.

Further, each of the sealing members 34 is a single member. Therefore, the sealing properties for the first coil end oil path 37 and the second coil end oil path 38 are ensured. Further, a reduced number of components enables reduction in product costs and improvement of productivity.

In the first embodiment described above, a circumferential dimension of each of the projecting portions 35 of the ring-shaped sealing member 34 is uniform. Instead, by setting the circumferential dimension of each of the projecting portions 35 smaller on a downstream side of the cooling oil than on an upstream side thereof, clearances between the projecting portions 35 arranged in the gaps between the adjacent divided coil ends 31 are reduced on the upstream side where the cooling oil is more likely to leak because of a high flow rate of the cooling oil, while clearances between the projecting portions 35 arranged in the gaps between the adjacent divided coil ends 31 are increased on the downstream side where the cooling oil is less likely to leak because of a low flow rate of the cooling oil. In this manner, ease of mounting of the sealing members 34 to the stator 2 can be improved while the leakage of the cooling oil is minimized.

Second Embodiment

Figure 5:
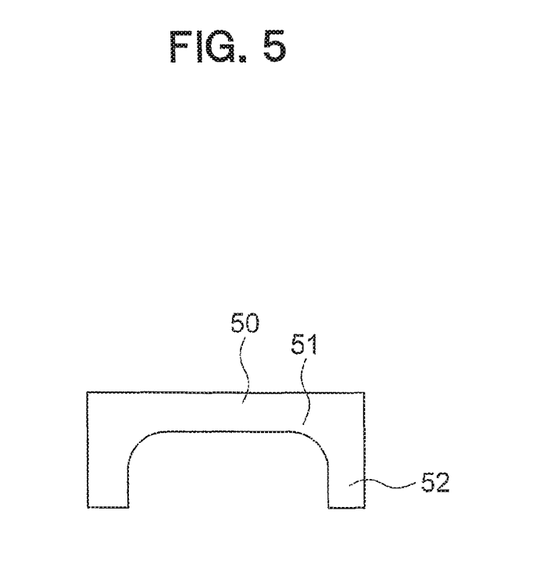
FIG. 5 is a front view of the sealing member piece of an electric motor according to a second embodiment of the present invention.
Figure 6:
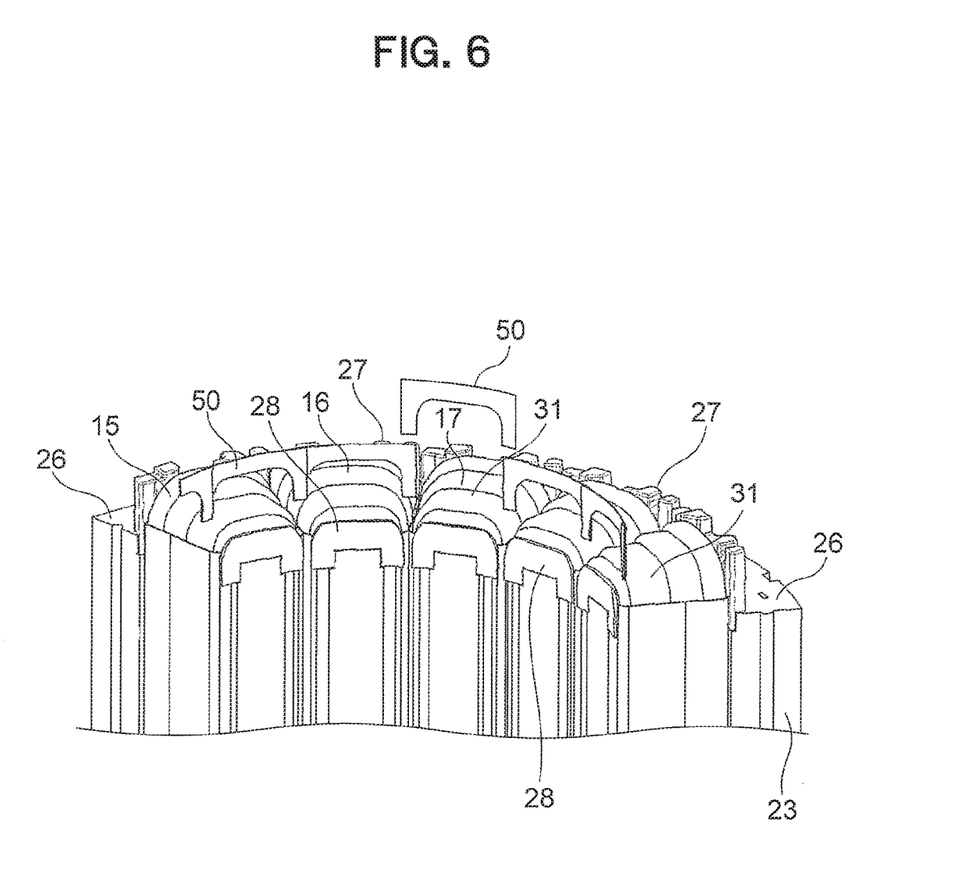
FIG. 6 is a view illustrating a state in which the sealing member pieces illustrated in FIG. 5 are mounted to the stator.

FIG. 5 is a front view of a sealing member piece 50 of an electric motor according to a second embodiment of the present invention, and FIG. 6 is a perspective view of a main part of the stator 2, for illustrating a state in which the sealing member pieces 50 illustrated in FIG. 5 are mounted to the stator 2.

In the second embodiment, a sealing member 34A includes a plurality of the sealing member pieces 50 each including a base portion 51 and projecting piece portions 52 formed on both end portions of the base portion 51.

Specifically, the projecting piece portions 52 to be introduced into the gaps between the adjacent divided coil ends 31 are overlapped to form the sealing member 34A into a ring-like shape.

Figure 7:
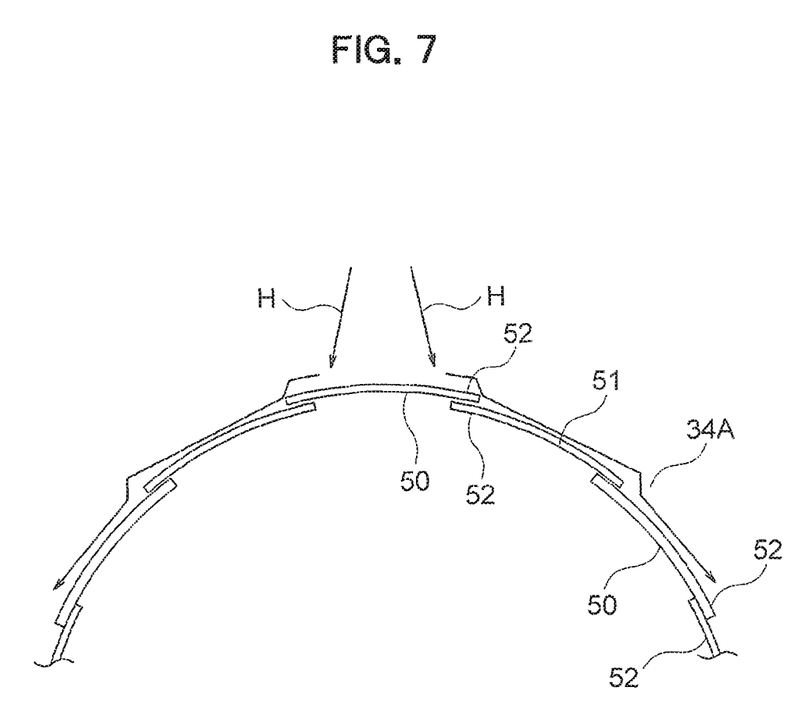
FIG. 7 is a view illustrating the arrangement relationship between the adjacent sealing member piece.

The sealing member pieces 50 are arranged so that the sealing member piece 50, which is closer to a vertical line passing through a center of the sealing member 34A, is located on an upper side with respect to the sealing member piece 50 that is farther from the vertical line in the overlapping portion, as illustrated in FIG. 7. In addition, symbol H denotes the flow of cooling oil.

Similarly to the sealing member 34 of the first embodiment, the sealing member 34A also has the lacking portion 39.

The remaining configuration is the same as that of the electric motor of the first embodiment.

In the second embodiment, when the stator core 21 is press-fitted into the frame 24, the base portions 51 of the individual sealing member pieces 50 are partially inserted between the second flanges 28 of the divided coil bobbins 20, and the U-phase coil portions 15, the V-phase coil portions 16, and the W-phase coil portions 17, which are the divided stator coils, thereby mounting the individual sealing member pieces 50 to the stator coil 22.

At this time, when the sealing member pieces 50 are mounted to the divided stators formed by winding the U-phase coil portions 15, the V-phase coil portions 16, and the W-phase coil portions 17 around the divided stator cores 23, which have different axial heights, a variation is generated in axial height position of the individual sealing member pieces 50.

However, the sealing member pieces 50 have flexibility. Therefore, the sealing member pieces 50 come into abutment against the first coil end cover 32 and the second coil end cover 33 in a flexed manner. As a result, the axial dimension variation between the divided stators is absorbed.

Further, the sealing member pieces 50 are arranged so that the sealing member piece 50, which is closer to the vertical line passing through the center of the sealing member 34A, is located on the upper side with respect to the sealing member piece 50 that is farther from the vertical line in the overlapping portion. Therefore, leakage of the cooling oil from gaps between the adjacent sealing member pieces 50 can be suppressed.

Although one sealing member piece 50 is provided so as to correspond to one divided stator in the second embodiment, one sealing member piece 50 may be provided so as to correspond to a plurality of divided stators.

In each of the embodiments described above, there has been described the electric motor including the stator 2 including the plurality of divided stator cores 23, and the U-phase coil portions 15, the V-phase coil portions 16, and the W-phase coil portions 17, which are the plurality of divided stator coils wound around the divided stator cores 23 through intermediation of the divided coil bobbins 20, in which the U-phase coil portions 15, the V-phase coil portions 16, and the W-phase coil portions 17 include the plurality of divided coil ends 31 projecting from both end surfaces of the divided stator cores 23 along the axial direction of the shaft 8. However, the above-mentioned electric motor is merely an example.

For example, the present invention is also applicable to an electric motor in which coil portions of respective phases are wound around slots, which each extend in the axial direction of the stator and are formed equiangularly through the stator core, in concentrated winding or wave winding.

Further, although the housing is constructed by the front frame 4, the center frame 3, and the rear frame 5, the housing may include the front frame and the center frame integrated with each other or the center frame and the rear frame integrated with each other.

Further, the rotator 1 is not limited to one including the permanent magnets 10, and may also be a rotator including the windings wound around the rotator core.

Moreover, although the electric motor has been described as the rotary electric machine in each of the embodiments described above, the present invention is also applicable to power generators.

What is claimed is:
1. A rotary electric machine, comprising:
   a housing;
   a shaft passing through the housing;
   a rotator housed inside the housing and fixed to the shaft;
   a stator fixed to the housing so as to surround an outer circumferential surface of the rotator, the stator comprising:
      an annular stator core; and
      a stator coil wound around the annular stator core through intermediation of a coil bobbin, the stator coil comprising coil ends projecting from both end surfaces of the annular stator core along an axial direction of the shaft;
   coil end covers arranged over entire circumferences of the coil ends so as to be opposed to each other in the axial direction; and
   ring-shaped sealing members having flexibility and being arranged on an inner diameter side of the stator coil so as to surround inner diameter portions of the coil ends, the ring-shaped sealing members, the coil end covers, and the coil ends forming coil end refrigerant flow paths through which a cooling medium flowing from an upper part of the housing into the housing flows downward.

2. A rotary electric machine according to claim 1, wherein the ring-shaped sealing members are respectively interposed between the coil ends and flanges formed on end portions of the coil bobbin.

3. A rotary electric machine according to claim 1, wherein each of the ring-shaped sealing members has a segmental circular shape having a lacking portion in a lower portion.

4. A rotary electric machine according to claim 1, wherein each of the ring-shaped sealing members is made of insulating paper.

5. A rotary electric machine according to claim 1, wherein each of the ring-shaped sealing members is formed of a single member.

6. A rotary electric machine according to claim 5, wherein:
   each of the coil ends comprises a plurality of coil end portions each formed by winding a conducting wire around a tooth of the annular stator core, the tooth having a distal end portion oriented toward an axial line of the shaft; and
   each of the ring-shaped sealing members comprises a plurality of projecting portions formed at intervals, each of the plurality of projecting portions being introduced into a gap formed between the adjacent coil end portions.

7. A rotary electric machine according to claim 6, wherein the plurality of projecting portions of each of the ring-shaped sealing members have a smaller circumferential width on a downstream side of the cooling medium than on an upstream side of the cooling medium.

8. A rotary electric machine according to claim 1, wherein:
   each of the coil ends comprises a plurality of coil end portions each formed by winding a conducting wire around a tooth of the annular stator core, the tooth having a distal end portion oriented toward an axial line of the shaft;
   each of the ring-shaped sealing members comprises a plurality of sealing member pieces each having, on both end portions, projecting piece portions each being introduced into a gap formed between the adjacent coil end portions; and
   each of the ring-shaped sealing members is formed to have a ring-like shape by overlapping the projecting piece portions of the adjacent sealing member pieces.

9. A rotary electric machine according to claim 8, wherein the plurality of sealing member pieces are arranged so that a sealing member piece closer to a vertical line passing through a center of each of the ring-shaped sealing members is located on an upper side with respect to a sealing member piece farther from the vertical line in an overlapping portion.

10. A rotary electric machine according to claim 1, wherein:
    the stator comprises a plurality of divided stator cores and a plurality of divided stator coils wound around the plurality of divided stator cores through intermediation of divided coil bobbins; and
    the plurality of divided stator coils comprise a plurality of divided coil ends projecting from both end surfaces of the plurality of divided stator cores along the axial direction of the shaft.

11. A rotary electric machine according to claim 1, wherein the cooling medium comprises cooling oil.

* * * * *